March 1, 1966    B. W. KELLEY ETAL    3,237,483
DIFFERENTIAL FOR WHEEL VEHICLES
Filed April 1, 1963    3 Sheets-Sheet 1

INVENTORS.
BRUCE W. KELLEY
BY FRANK E. KESKE

ATTORNEYS

INVENTORS.
BRUCE W. KELLEY
BY FRANK E. KESKE

ATTORNEYS

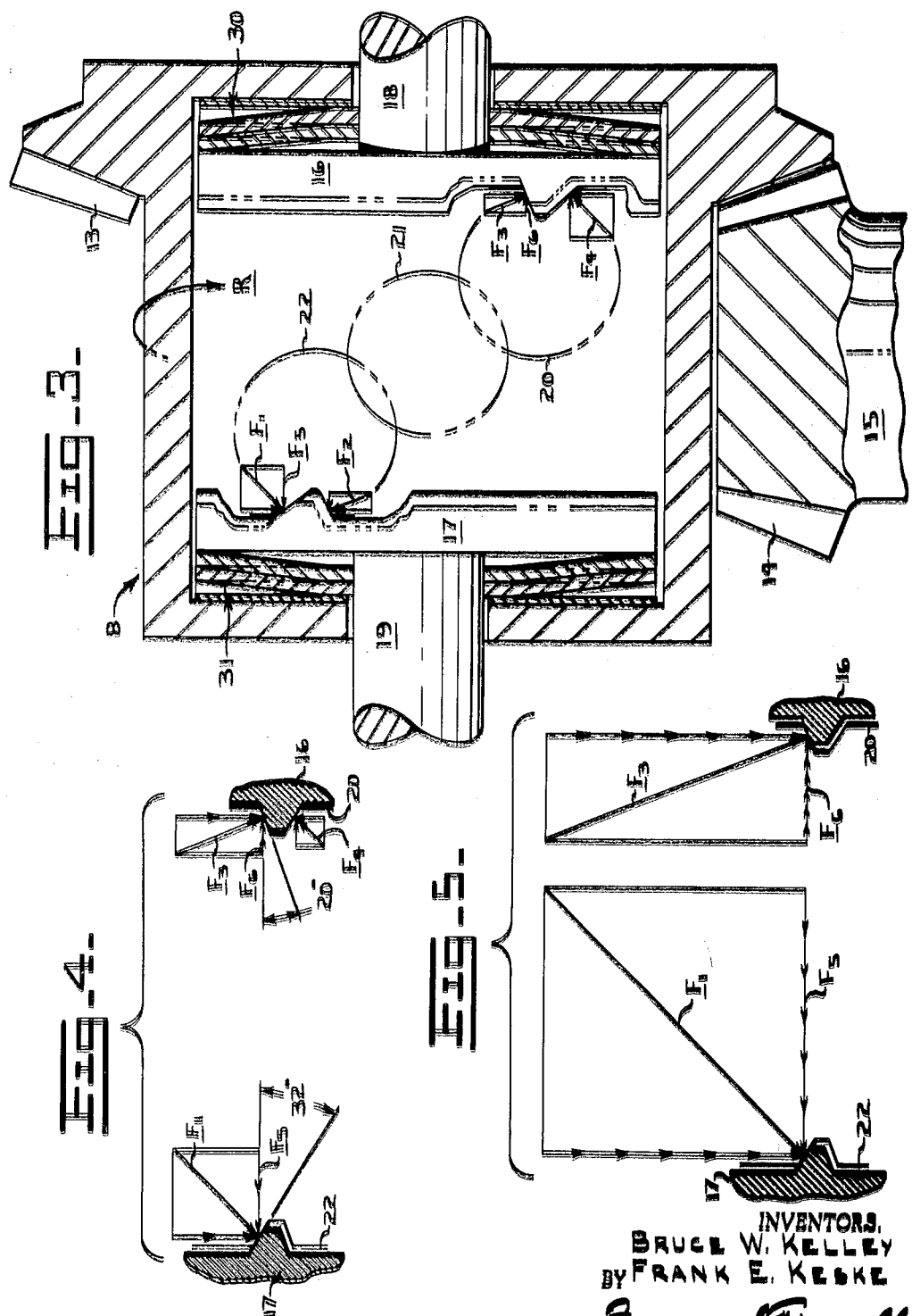

United States Patent Office 3,237,483
Patented Mar. 1, 1966

3,237,483
DIFFERENTIAL FOR WHEEL VEHICLES
Bruce W. Kelley, Washington, and Frank E. Keske, Chillicothe, Ill., assignors to Caterpillar Tractor Co., Peoria, Ill., a corporation of California
Filed Apr. 1, 1963, Ser. No. 269,596
20 Claims. (Cl. 74—715)

This invention relates to a differential for wheel vehicles and more particularly relates to a limited slip differential of the frictional resistance type.

Conventional frictional resistance type limited slip differentials generally include a preloaded clutch pack or a worm gear arrangement. Although the clutch pack type differential is relatively simple to engineer and manufacture, the clutch preload thereof must be frequently adjusted and the use of special lubricating oils are generally required to prevent chatter of the clutch plates. Whereas the utilization of a worm gear arrangement tends to lessen the problem of frequent adjustment and chatter, further disadvantages flow therefrom. One disadvantage is the fact that high tangential or tooth loads are oftentimes imposed on the driven gears thereof.

A further disadvantage accrues from the fact that the inefficiency of worm gear type differentials is primarily dependent upon the irreversibility or lack of efficiency of the gear attempting to drive the pinion. Such a construction and arrangement results in an absorption of considerable horsepower and heat by one gear set and thus generally dictates the need for expensive bimetal gear combinations.

This invention has overcome many of the above described difficulties by providing a differential comprising a pair of juxtaposed helical face gears adapted to efficiently drive vehicle wheels during various phases of vehicle operation. A carrier is rotatably mounted between the face gears and uniquely mounts gear means arranged to mesh with the face gears for power transmission purposes.

Novel aspects of this invention comprise preload means arranged to urge the meshing face gears and gear means together with predetermined forces for providing a predetermined frictional resistance to rotation of one face gear relative to the other.

Further novel aspects of this invention comprise means formed on the teeth of the gear means and face gears for gradually relieving the preload means.

In accordance with the above discussions, an object of this invention is to provide an efficient differential for wheel vehicles which will impart the desired driving power thereto during various phases of vehicle operation.

Another object of this invention is to provide a compact differential with frictional resistance to wheel slip which is simple and durable in construction.

A further object of this invention is to provide a differential comprising uniquely arranged helical pinion gears adapted to afford predetermined magnitudes of frictional resistance to wheel slip during selected phases of differential operation.

A still further object of this invention is to provide a limited slip differential comprising a preload means for assuring that sufficient frictional resistance will be afforded in the differential for vehicle wheel driving purposes during critical phases of vehicle operation.

A still further object of this invention is to provide means for efficiently relieving the preload effect of a limited slip differential of the frictional resistance type during predetermined torque phases of differential operation.

Further and more specific objects of this invention will become apparent from the following description taken in connection with the accompanying drawings wherein:

FIG. 3 is a partially sectioned view illustrating the relationship of preload force components acting as between meshing pinion and face gears employed in the differential shown in FIGS. 1 and 2;

FIG. 4 is an enlarged view, more particularly disclosing the force components in the differential for a given operating condition;

FIG. 5 is a view similar to FIG. 4 and disclosing the force components in the differential for another operating condition.

Figure 1:
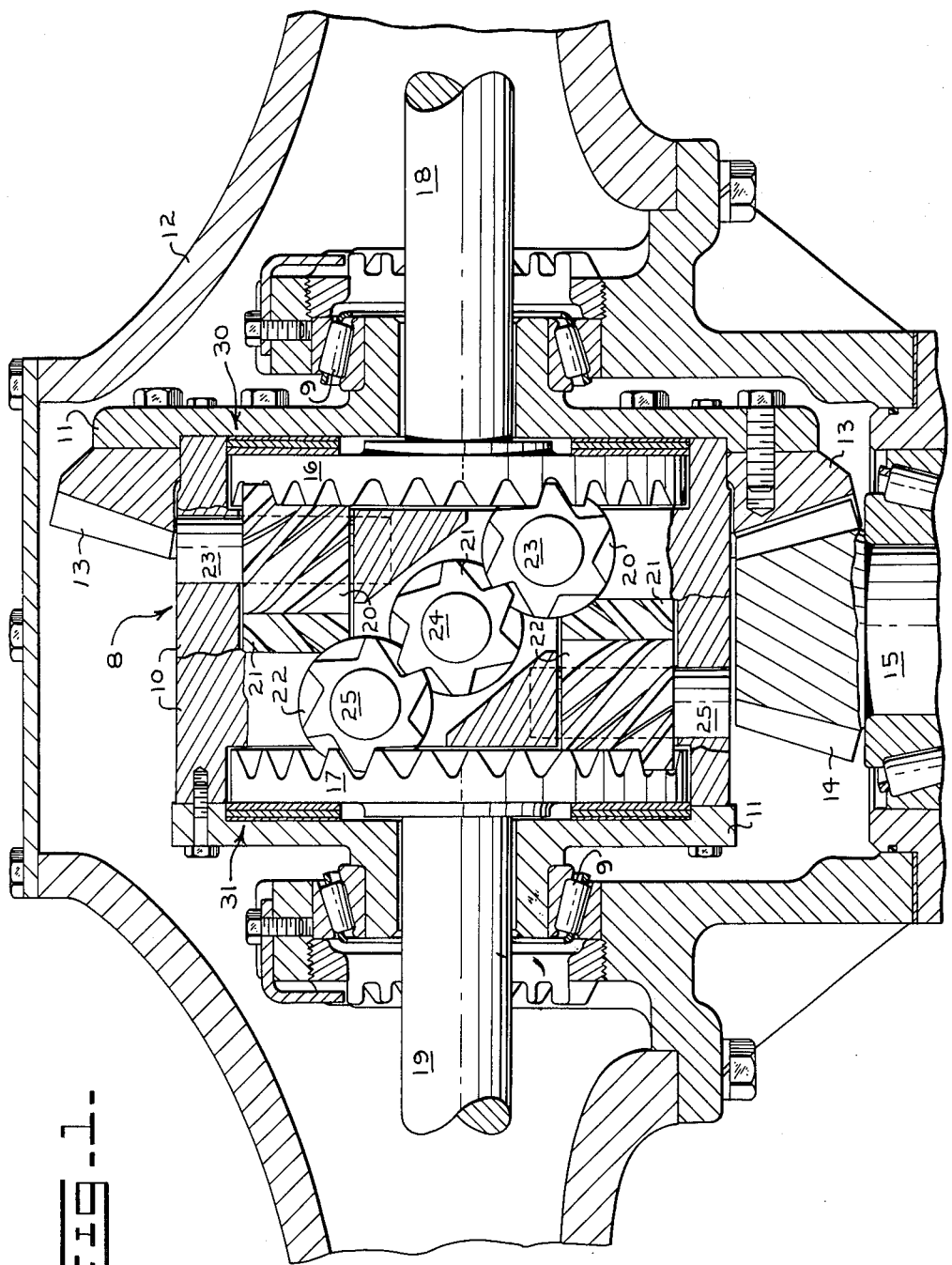
FIG. 1 is a longitudinal, partially sectioned view disclosing the differential of this invention with the preload thereof fully relieved.
Figure 2:
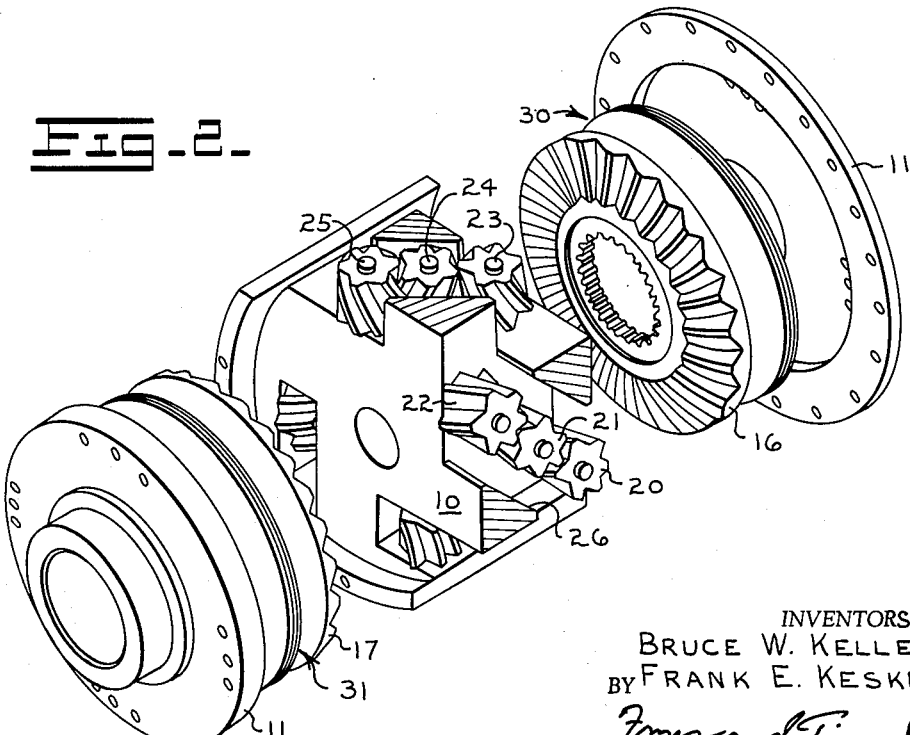
FIG. 2 is an exploded isometric view disclosing the basic elements of the differential shown in FIG. 1.

Referring to FIGS. 1 and 2, the differential of this invention employs a carrier 8 supported on a pair of spaced roller bearing assemblies 9 and comprising a central pinion carrier 10 and outer support flanges 11. The differential is enclosed by a housing 12 mounted on the vehicle in a conventional manner. Drive is imparted to the carrier by a bevel gear 13, attached thereto by conventional means such as bolts or the like. Drive in turn is imparted to the bevel gear by a pinion gear 14 mounted on shaft 15, drivingly connected to a vehicle transmission (not shown). It should be noted that FIG. 3 discloses the carrier and bevel gear as an integral member for clarification and explanation purposes.

A pair of juxtaposed and spaced helical face gears 16 and 17 are loosely splined or otherwise suitably keyed to the inner ends of a pair of axles 18 and 19, respectively, to permit relative axial movement of the gears on the axles. The axles are further arranged to extend outwardly in driving connection with the vehicle wheels (not shown). Preferably, four sets of three intermeshing gear means or helical pinions 20, 21 and 22 are rotatably mounted on the carrier on stub shafts 23, 24 and 25, respectively. The axes of each set of pinion gears and their respective stub shafts are preferably arranged in a plane with its askewed relative to the longitudinal axis of the carrier.

The carrier is constructed in a pinwheel fashion to provide cut-out portions 26 wherein each set of aligned helical pinions are arranged. As more clearly shown in FIG. 1, peripheral portions of outer helical pinions 20 and 22 extend a sufficient distance past the end faces of the central carrier 10 to permit a mesh relationship with face gears 16 and 17, respectively. The longitudinal axes of the outer pinions are preferably arranged to be offset relative to the longitudinal axes of the face gears, while the longitudinal axes of the intermediate pinions are preferably arranged to substantially intersect a line connecting the longitudinal axes of the face gears, i.e., the longitudinal axis of the central carrier.

The pinions or gear means preferably comprise helically offset and cylindrical pinion gears having unequal pressure angles on opposite tooth faces. To facilitate their meshing relationship, pinions 20 and 22 provide a helix which is formed in a direction opposite to the helix formation of pinion 21. The face gears 16 and 17 are constructed and arranged in accordance with standard skew axis gearing principles to provide an efficient gearing arrangement with the meshing pinion gears. In particular, the teeth of the face gears are necessarily also formed with unequal pressure angles which are arranged to suitably mesh with the teeth of the pinion gears.

As will be hereinafter more fully understood, the above briefly described unequal pressure angle relationship of the pinion and face gears comprises a means for gradually relieving a preload means which functions to urge the meshing pinion and face gears together with a predetermined force to build up a frictional resistance for effectively resisting excessive differential action.

One of the desired features of this gearing arrangement is that the axial thrust in the pinions is self-cancelling to thus eliminate the need for heavy thrust washers or the like. Furthermore, the relative axial position of this type of gearing in the assembly is not generally critical and therefore, the need for a precise machining of carrier 10 is virtually eliminated. Since the mesh relationship existing between one of the helical pinions and a face gear does not, per se, constitute a novel aspect of this invention, further technical explanation thereof will not be set forth. In particular, specific teachings drawn to such skew axis gearing arrangements are known in the art.

Referring more particularly to FIG. 2, it can be seen that each set of pinions 20 and 22 has a hand and is located in the proper quadrant of the area between the face gears for that hand relative to its mating face gears and in correct meshing relationship thereto to provide an opposite sense of rotation therebetween when viewed from the toothed side of the face gear, along the axis of rotation thereof.

Rotary motion is imparted to carrier 10 by means of the hereinbefore described pinion gear 14 and bevel gear 13 arrangement. Should the vehicle wheels (not shown), connected to drive shafts 18 and 19, have adequate traction for the vehicle driving purposes, carrier 8, face gears 16 and 17 and the axles will rotate as a unit in the normal manner. During this condition of vehicle operation, pinions 20–22 will not rotate on their respective axes 23–25.

However, should one of the wheels encounter a slippery surface, or the like, so as to reduce the coefficient of friction between the wheel and the ground, the differential will resist the tendency to differentiate to permit the wheel with traction to move the vehicle. During this condition of vehicle operation, gears 20 or 22 will tend to "walk around" their meshing face gear in somewhat the same manner as a standard differential.

In general, resistance to spinning of one wheel is dependent on the frictional resistance encountered due to the sliding action occurring between the teeth of the pinion gears and the face gears. Since such frictional resistance is a direct function of tooth load, it is desirable to provide a preload in the differential to permit transfer of torque to the wheel having good traction when the other wheel has little or no traction. Such a preload means may comprise one or more Belleville type springs 30 and 31, respectively arranged between each of face gears 16 and 17, and the carrier.

As above suggested, the assembly is constructed and arranged to compress the springs a sufficient amount to urge the face gears into engagement with the meshing pinion gears. A sufficient force is therefore created to impart predetermined loads on the gear teeth as indicated by the force diagrams in FIG. 3. The resultant above-described forces, indicated by arrows $F_1$, $F_2$, $F_3$ and $F_4$ are of sufficient magnitude to provide a maximum predetermined frictional resistance to relative rotation between face gears 16 and 17 and to permit transfer of torque to the wheel having good traction when the other wheel tends to spin due to poor tractive conditions.

Figure 6:
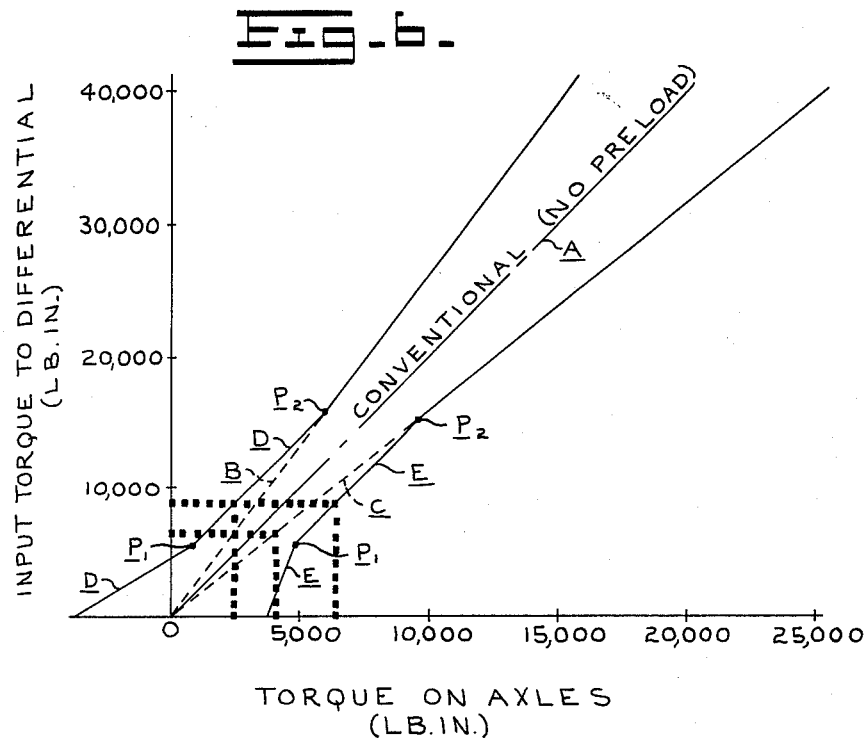
FIG. 6 discloses performance curves comparing the differential of this invention with a conventional differential.

FIG. 6 discloses performance curves, plotting torque to the axles against input torque to the differential, drawn to a conventional differential with and without a frictional means employed therein and the differential of this invention. Line A indicates the characteristics of a conventional differential wherein the input torque to the differential is normally evenly divided between the two wheels of the vehicle. Otherwise stated, should the input torque to the differential constitute 20,000 lb. in., a torque of 10,000 lb. in., would be directed to each of the wheels. With a differential of this type, however, the input torque to the differential is limited by the coefficient of friction of the wheel having the poorest traction.

For example, should one of the wheels encounter a slippery surface so as to reduce the coefficient of friction thereat to substantially zero, the torque transmitted to the wheel having traction would be only equal to that required to rotate the wheel on the slippery surface. The imput torque to the differential would be limited to twice that required to rotate the slipping wheel on such a surface. The addition of a frictional resistance device such as a clutch pack to the unpreloaded differential provides a curve substantially corresponding to dashed lines B and C. In this type of differential, the torque transmitted to the non-slipping wheel is increased an amount proportional to the value of the frictional resistance to differential action of the mechanism.

For example, should a wheel located on a slippery surface have sufficient traction to develop a torque of 2,500 lb. in., projection of the illustrated dotted lines from that value on the base of the curve to line B, across to line C and the back to the base of the curve indicates that approximately 4,300 lb. in. of torque would be transmitted to the wheel having good traction. Such a condition would thus permit the differential to accept approximately 6,800 lb. in. of torque, i.e., the total torque accepted by the two axles. It becomes obvious from the curve, however, that as the traction of one of the wheels approaches zero very little torque is transmitted to the wheel having good traction since the mechanism is dependent on the load in the differential, provided by the slipping wheel, to increase the frictional resistance to the differential action.

Employment of a typical 1,500 lb. in. preload in the above-described differential of this invention provides curves D and E which indicate an efficient torque transfer by the differential even during very poor tractive conditions for one wheel. For example, should the wheel having the lowest coefficient of friction accept 2,500 lb. in. of torque the dotted line projection of that point on curves D and E indicates that due to such preload approximately 6,500 lb. in. of torque will be directed to the wheel having good traction. Thus, the differential is permitted to accept an input torque of approximately 9,000 lb. in. before the wheel having poor traction slips. It becomes obvious from this comparison that the subject invention is more effective in this range of extremely poor traction than the more commonly used differentials.

It is desirable that separation of lines D and E of this curve be maintained within an acceptable range throughout the major maneuvering phases of vehicle operation. It is further desirable that a sufficient value of preload be provided in the lower range of the curve with a portion of the preload effect being gradually relieved at the lower extreme of the maneuvering range of the vehicle. Also, the remainder of the preload effect should be desirably removed at a point where at the load in the differential, due to input torque, is sufficient to provide the necessary amount of torque transfer to the axle having the greatest amount of traction.

The means provided to achieve such desiderata comprises face gears 16 and 17 and pinions 20 and 22 which are constructed and arranged so that during one direction of relative rotation of carrier 10, as indicated by arrow R in FIG. 3, the intermeshing teeth of face gear 16 and pinion 20 act on the low pressure angle side of the teeth of face gear 17 and pinion 22 act on a high pressure angle side thereof. Thus, as the torque input to the differential is increased, the forces $F_1$ and $F_3$ are increased as illustrated in FIG. 4. The separating force $F_5$ increases at a greater rate for a given increase in force $F_1$ than does the separating force $F_6$ for a proportional increase in force $F_3$. Therefore, complete relief of the preload effect of face gear 17 and pinion 22 will occur before that of face gear 16 and pinion 20. As soon as this load is sufficient to overcome the preload of springs 31, face gear 17 will be axially displaced to the phantom line position shown in FIG. 3 to thus relieve the effect of the preload on that side of the differential. This point is indicated on the performance curves at $P_1$ whereat the angular relationship of curves D and E change.

As load continues to increase, the opposite gears 16 and 20 which are working on the low pressure angle side of the teeth continue to be affected by the preload of springs 30 until the load reaches a value equal to the preload force thereat as illustrated in FIG. 5. This point is indicated on the curve at $P_2$ whereat lines D and E coincide with lines B and C. At this point, the preload effect is entirely relieved, as also illustrated in FIG. 1, and no longer affects the performance of the vehicle wheels. The springs 30 and 31 thus become, in effect, solid spacers and the inefficiency of the differential is now a function only of the torque load.

The area of the parallelogram defined by the four points $P_1$ and $P_2$ represents the major portion of the maneuvering range of the vehicle and illustrates the fact that the differential of this invention is arranged to provide adequate torque transfer for the proper slip resisting characteristics without adversely affecting vehicle steering. The particular geometry of the gears selected for any specific application are, of course, determined by one skilled in the art as above stated. For example, for one specific application it was found desirable to employ angles of 20° and 32° on the gear teeth, as illustrated in FIG. 4. The value of the preload for an actual application will generally be that wherein a maximum resistance to slip is provided without adversely affecting vehicle steering. Moreover, it should be understood that preloads on either side of a differential can be varied independently of the other to produce a performance curve best suited for a particular application.

We claim:

1. A differential comprising a pair of juxtaposed, helical face gears arranged for rotation about an axis, a carrier arranged between said face gears for rotation about said axis, gear means mounted on said carrier and operatively meshing with said face gears for differentially permitting one face gear to rotate faster than the other face gear and preload means for urging said meshing face gears and gear means together with predetermined forces for providing a predetermined frictional resistance to rotation of one face gear relative to the other.

2. The invention of claim 1 wherein the teeth of said gear means and said face gears are constructed and arranged for gradually removing the effect of said preload means in a predetermined manner.

3. A differential comprising a pair of juxtaposed, helical face gears mounted on spaced axles for rotation therewith, said face gears further arranged for relative axial movement on said spaced axles, a carrier rotatably arranged between said face gears, at least one set of aligned and intermeshing helical pinion gears, each pinion gear being rotatably mounted on said carrier, said set arranged so that each outer pinion gear thereof meshes with one of said face gears and preload means arranged between each of said face gears and said carrier for urging the meshing outer pinion and face gears together with a predetermined force.

4. The invention of claim 3 wherein the teeth of said meshing face and pinion gears are constructed and arranged for gradually removing the effect of the force applied therebetween by said preload means in a predetermined manner.

5. The invention of claim 3 wherein four sets of three aligned pinion gears are rotatably mounted on each of four sides of said carrier, the helix of an intermediate pinion gear of each set being formed in an opposite direction to the helix of outer pinion gears thereof which are in mesh with said face gears, the longitudinal axes of said outer pinion gears arranged to be offset relative to the longitudinal axes of said face gears.

6. The invention of claim 3 wherein said preload means comprises at least one Belleville spring.

7. A differential comprising a carrier arranged for rotation about an axis and adapted to be driven by a drive output of a vehicle, juxtaposed face gears comprising teeth having unequal pressure angles arranged for rotation about said axis and further arranged on either side of said carrier, said carrier having cut-out portions formed in four side portions thereof, each of said cut-out portions arranged to extend between said face gears, a set of three aligned and meshing helical pinion gears comprising teeth having unequal pressure angles arranged in each cut-out portion, the helix of an intermediate pinion gear of each set formed in an opposite direction of the helix of outer pinion gears thereof, said outer pinion gears arranged to mesh with said face gears, the longitudinal axes of said outer pinion gears arranged to be offset relative to the longitudinal axes of said face gears and the longitudinal axes of said intermediate pinion gears arranged to substantially intersect a line connecting the longitudinal axes of said face gears and preload means arranged between each of said face gears and said carrier to urge said meshing pinion and face gears together with a predetermined force.

8. In a differential, the combination of a carrier arranged for rotation about a longitudinal axis, four sets of three aligned and meshing helical pinion gears mounted for rotation on peripheral portions of said carrier, the opposite surfaces forming each tooth of said pinion gears comprising unequal pressure angles, the helix of an intermediate pinion gear of each set formed in an opposite direction to the helix of outer pinion gears thereof, opposed face gears arranged on either side of said carrier for rotation about said axis, each of said face gears having teeth forming unequal pressure angles arranged to mesh with the teeth of the four outer pinion gears of said sets.

9. The invention of claim 8 wherein the axes of each set of pinion gears are arranged in a plane which is askewed relative to said longitudinal axis and the axes of said outer pinion gears are arranged to be offset relative to said longitudinal axis.

10. The invention of claim 8 further comprising preload means arranged between at least one of said face gears and said carrier for urging said one face gear and the pinions which are meshing therewith together with a predetermined force.

11. In a differential, a pair of juxtaposed face gears arranged for rotation about an axis, at least two sets of helical pinion gear means arranged to mesh with each of the face gears and a carrier for said pinion gear means, each of said sets of pinion gear means having a hand and each being located in the proper quadrant of the area between the face gears for that hand relative to its meshing face gears thereby providing an opposite sense of rotation therebetween when viewed from the toothed side of said meshing face gear, along said axis.

12. The invention of claim 11 further comprising preload means arranged for urging said meshing face gears and pinion gear means together with predetermined forces for providing a predetermined frictional resistance to rotation of one face gear relative to the other.

13. The invention of claim 12 further wherein the teeth of said face gears and mating pinion gear means are constructed and arranged for gradually removing the effect of said preload means in a predetermined manner.

14. A differential comprising a carrier mounted for rotation about an axis, juxtaposed face gears arranged for rotation about said axis and further arranged on each side of the carrier and at least one pinion gear means comprising a set of three meshing helical pinion gears rotatably mounted on the carrier, each of two outer pinion gears of the set arranged to mesh with a respective face gear and each of said pinion gear means having a hand and each being located in the proper quadrant of the area between the face gears for that hand relative to its meshing face gears thereby providing an opposite sense of rotation therebetween when viewed from the toothed side of said meshing face gear, along said axis.

15. The invention of claim 14 further comprising preload means for urging said meshing face gears and pinion gears together with predetermined forces for providing a predetermined frictional resistance to rotation of one face gear relative to the other.

16. The invention of claim 15 wherein the teeth of said face gears and mating pinion gear means are constructed and arranged for gradually removing the effect of said preload means in a predetermined manner.

17. In a differential including two juxtaposed face gears arranged for rotation about a common axis, at least one pinion arranged to mesh with each of said juxtaposed gears to thus form a pair of pinions, each of said pinions arranged to rotate about an axis which is offset and non-intersecting with respect to the common axis of said juxtaposed gears and an intermediate pinion interconnecting said pair of pinions, said pair of pinions having a hand and being located in the proper quadrant of the area between the face gears for that hand relative to its meshing face gears thereby providing an opposite sense of rotation therebetween when viewed from the toothed side of said meshing face gear, along said axis.

18. The invention of claim 17 wherein said pinions are constructed and arranged so that substantially no axial thrust is imparted thereto during operation of said differential.

19. In a differential comprising a pair of juxtaposed face gears, at least one helical offset pinion arranged to mesh with each of said juxtaposed gears to thus form a pair of pinions, means operatively interconnecting said pair of pinions, the axis of each pinion arranged so that it is not common with respect to the axis of another pinion said pair of pinions having a hand and being located in the proper quadrant of the area between the face gears for that hand relative to its meshing face gears thereby providing an opposite sense of rotation therebetween when viewed from the toothed side of said meshing face gear, along said axis.

20. The invention of claim 19 wherein said pinions are constructed and arranged so that substantially no axial thrust is imparted thereto during operation of said differential.

References Cited by the Examiner
UNITED STATES PATENTS

| Re. 25,500 | 12/1963 | O'Brien | 74—710.5 |
| 2,070,569 | 2/1937 | Asam | 74—715 |
| 2,650,507 | 9/1953 | Clintsman | 74—710.5 X |
| 2,823,559 | 2/1958 | Ransom | 74—715 |
| 2,898,778 | 8/1959 | Ransom | 74—711 |

FOREIGN PATENTS

| 1,236,945 | 6/1960 | France. |

DON A. WAITE, *Primary Examiner.*